(12) United States Patent
Wakao et al.

(10) Patent No.: US 10,934,958 B2
(45) Date of Patent: Mar. 2, 2021

(54) AIR-FUEL RATIO DETECTION DEVICE AND AIR-FUEL RATIO DETECTION METHOD

(71) Applicant: TOYOTA JIDOSHA KABUSHIKI KAISHA, Toyota (JP)

(72) Inventors: Kazuhiro Wakao, Susono (JP); Keiichiro Aoki, Sunto-gun (JP); Keisuke Mizutani, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/402,451

(22) Filed: May 3, 2019

(65) Prior Publication Data

US 2019/0345889 A1    Nov. 14, 2019

(30) Foreign Application Priority Data

May 8, 2018 (JP) ................................. 2018-090210

(51) Int. Cl.
| | | |
|---|---|---|
| *F02D 41/14* | (2006.01) | |
| *G01K 7/12* | (2006.01) | |
| *G01N 27/407* | (2006.01) | |
| *G01N 27/416* | (2006.01) | |
| *G01N 27/409* | (2006.01) | |

(52) U.S. Cl.
CPC ..... *F02D 41/1494* (2013.01); *F02D 41/1439* (2013.01); *F02D 41/1454* (2013.01); *F02D 41/1458* (2013.01); *F02D 41/1486* (2013.01); *F02D 41/1487* (2013.01); *G01K 7/12* (2013.01); *G01N 27/409* (2013.01); *G01N 27/4071* (2013.01); *G01N 27/4076* (2013.01); *G01N 27/416* (2013.01)

(58) Field of Classification Search
CPC ............ F02D 41/1454; F02D 41/1456; F02D 41/1458; F02D 41/1486; F02D 41/1487; G01N 27/4071; G01N 27/4076; G01N 27/409; G01N 27/41
USPC ........ 123/676, 685, 689, 693, 694, 695, 703
See application file for complete search history.

(56) References Cited

U.S. PATENT DOCUMENTS

| | | | | |
|---|---|---|---|---|
| 4,112,893 A | * | 9/1978 | Anzai | ................. F02D 41/1479 123/689 |
| 5,322,047 A | * | 6/1994 | Oliu | .................... F02D 41/1446 123/676 |

(Continued)

FOREIGN PATENT DOCUMENTS

JP    2009-053108    3/2009

*Primary Examiner* — Erick R Solis
(74) *Attorney, Agent, or Firm* — Finnegan, Henderson, Farabow, Garrett & Dunner, LLP

(57) ABSTRACT

An air-fuel ratio detection device 1, 1' comprises: a sensor element 2, 2' including a sensor cell 10; a voltage application circuit 40, 40' applying voltage to the sensor cell; a current detector 42, 42' detecting an output current of the sensor cell; an air-fuel ratio calculating part 61 configured to calculate an air-fuel ratio of an exhaust gas; and a parameter detecting part 62 configured to detect or calculate a temperature correlation parameter correlated with a temperature of the sensor element. The air-fuel ratio calculating part is configured to calculate the air-fuel ratio of the exhaust gas based on the temperature correlation parameter and the output current detected when a predetermined voltage is applied to the sensor cell.

16 Claims, 12 Drawing Sheets

(56) References Cited

U.S. PATENT DOCUMENTS

| | | | |
|---|---|---|---|
| 6,789,533 B1* | 9/2004 | Hashimoto | F02D 41/123 |
| | | | 123/434 |
| 6,918,385 B2* | 7/2005 | Ohkuma | F02D 41/1456 |
| | | | 123/689 |
| 8,108,130 B2* | 1/2012 | Scheuerer | F02D 41/123 |
| | | | 123/320 |
| 9,885,685 B2* | 2/2018 | Surnilla | F02D 41/1494 |
| 2002/0003831 A1* | 1/2002 | Hashimoto | G01N 27/4067 |
| | | | 374/144 |

* cited by examiner

AIR-FUEL RATIO DETECTION DEVICE AND AIR-FUEL RATIO DETECTION METHOD

FIELD

The present invention relates to an air-fuel ratio detection device and air-fuel ratio detection method.

BACKGROUND

In the past, it has been known to arrange an air-fuel ratio sensor in an exhaust passage of an internal combustion engine and use the air-fuel ratio sensor to detect an air-fuel ratio of exhaust gas. In the air-fuel ratio sensor described in PTL 1, a sensor element is heated by a heater and the energization amount to the heater is controlled so that the temperature of the sensor element is maintained at a predetermined activation temperature.

CITATION LIST

Patent Literature

[PTL 1] Japanese Unexamined Patent Publication No. 2009-053108

SUMMARY

Technical Problem

However, provision of a heater at an air-fuel ratio sensor causes the air-fuel ratio sensor to increase in size. On the other hand, if an air-fuel ratio sensor is not provided with a heater, the sensor element will fluctuate in temperature. As a result, the output current corresponding to the air-fuel ratio will change and the precision of detection of the air-fuel ratio will fall. Further, a similar problem will arise if a heater malfunctions.

Therefore, an object of the present invention is to keep a precision of detection of an air-fuel ratio from falling when a sensor element fluctuates in temperature.

Solution to Problem

The summary of the present disclosure is as follows.

(1) An air-fuel ratio detection device comprising: a sensor element including a sensor cell; a voltage application circuit applying voltage to the sensor cell; a current detector detecting an output current of the sensor cell; an air-fuel ratio calculating part configured to calculate an air-fuel ratio of an exhaust gas; and a parameter detecting part configured to detect or calculate a temperature correlation parameter correlated with a temperature of the sensor element, wherein the air-fuel ratio calculating part is configured to calculate the air-fuel ratio of the exhaust gas based on the temperature correlation parameter and the output current detected when a predetermined voltage is applied to the sensor cell.

(2) The air-fuel ratio detection device described in above (1), the temperature correlation parameter is a temperature of the sensor element calculated from an impedance of the sensor cell.

(3) The air-fuel ratio detection device described in above (1) or (2), the air-fuel ratio calculating part is configured to convert the output current to a value corresponding to a reference value of the temperature correlation parameter based on the temperature correlation parameter, and calculate the air-fuel ratio of the exhaust gas from the converted value using the relationship of the output current and the air-fuel ratio of the exhaust gas at the reference value.

(4) The air-fuel ratio detection device described in above (3), wherein the air-fuel ratio calculating part is configured to multiply a correction coefficient corresponding to the temperature correlation parameter with the output current to thereby convert the output current to a value corresponding to the reference value.

(5) The air-fuel ratio detection device described in above (1) or (2), wherein the air-fuel ratio calculating part is configured to use a relationship between the output current and the air-fuel ratio of the exhaust gas at a reference value of the temperature correlation parameter to calculate the air-fuel ratio of the exhaust gas from the output current, and correct the calculated air-fuel ratio based on the temperature correlation parameter to calculate the final air-fuel ratio of the exhaust gas.

(6) The air-fuel ratio detection device described in above (5), wherein the air-fuel ratio calculating part is configured to add a value obtained by multiplying a correction coefficient corresponding to the temperature correlation parameter with a difference between the calculated air-fuel ratio and a stoichiometric air-fuel ratio to the stoichiometric air-fuel ratio to calculate the final air-fuel ratio of the exhaust gas.

(7) The air-fuel ratio detection device described in above (4) or (6), wherein the correction coefficient is set to a value different for each sign of the output current.

(8) A method of detecting an air-fuel ratio of exhaust gas using a sensor element including a sensor cell, the method comprising: applying voltage to the sensor cell, detecting an output current of the sensor cell, detecting or calculating a temperature correlation parameter correlated with a temperature of the sensor element, and calculating the air-fuel ratio of the exhaust gas based on the output current and the temperature correlation parameter.

Advantageous Effects of Invention

According to the present invention, it is possible to keep a precision of detection of an air-fuel ratio from falling when a sensor element fluctuates in temperature.

DESCRIPTION OF EMBODIMENTS

Figure 1:
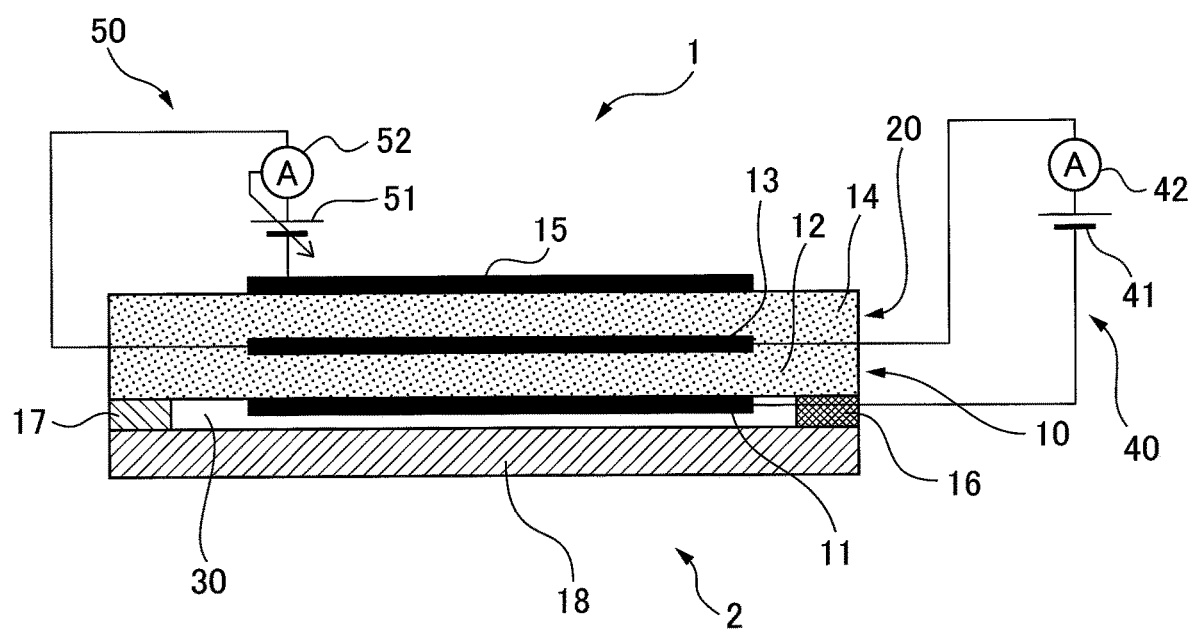
FIG. 1 is a view schematically showing an air-fuel ratio detection device according to a first embodiment.

Below, referring to the drawings, embodiments of the present invention will be explained in detail. Note that, in the following explanation, similar components are assigned the same reference notations.

First Embodiment

First, referring to FIG. 1 to FIG. 8, a first embodiment of the present invention will be explained.

<Configuration of Air-Fuel Ratio Detection Device>

FIG. 1 is a view schematically showing an air-fuel ratio detection device 1 according to the first embodiment. The air-fuel ratio detection device 1 is arranged in an exhaust passage of an internal combustion engine mounted in a vehicle and detects an air-fuel ratio of the exhaust gas. Note that, the "air-fuel ratio of the exhaust gas" (below, simply referred to as the "air-fuel ratio") means the ratio of the mass of the air to the mass of the fuel supplied up to when the exhaust gas is produced (mass of air/mass of fuel) and is estimated from a concentration of oxygen and a concentration of reduced gas in the exhaust gas.

The air-fuel ratio detection device 1 is provided with a sensor element 2. FIG. 1 shows a cross-sectional view of the sensor element 2. The sensor element 2 is comprised of a plurality of layers stacked together. Specifically, the sensor element 2 is provided with a first solid electrolyte layer 12, second solid electrolyte layer 14, diffusion regulating layer 16, first barrier layer 18, and second barrier layer 17.

The first solid electrolyte layer 12 and the second solid electrolyte layer 14 are sheet members having oxide ion conductivity. The first solid electrolyte layer 12 and the second solid electrolyte layer 14 are, for example, formed from sintered bodies comprised of $ZrO_2$(zirconia), $HfO_2$, $ThO_2$, $Bi_2O_3$, etc. to which CaO, MgO, $Y_2O_3$, $Yb_2O_3$, etc. are added as stabilizers. Further, the diffusion regulating layer 16 is a sheet member having gas permeability. The diffusion regulating layer 16 is, for example, formed from a porous sintered body made of alumina, magnesia, silica, spinel, mullite, or other heat resistant inorganic substance. The first barrier layer 18 and the second barrier layer 17 are sheet members having gas barrier properties. The first barrier layer 18 and the second barrier layer 17, for example, are formed as layers containing alumina.

The layers of the sensor element 2 are comprised of, from the bottom of FIG. 1, the first barrier layer 18, second barrier layer 17 and diffusion regulating layer 16, first solid electrolyte layer 12, and second solid electrolyte layer 14 stacked in that order. The first solid electrolyte layer 12, diffusion regulating layer 16, first barrier layer 18, and second barrier layer 17 define a measured gas chamber 30. The measured gas chamber 30 is configured so that exhaust gas flows into the measured gas chamber 30 through the diffusion regulating layer 16 when the sensor element 2 is arranged inside the exhaust passage. Therefore, the measured gas chamber 30 communicates with the exhaust passage through the diffusion regulating layer 16.

The sensor element 2 is further provided with a first electrode 11, second electrode 13, and third electrode 15. The first electrode 11 is placed on the surface of the first solid electrolyte layer 12 on the measured gas chamber 30 side so as to be exposed to the exhaust gas of the measured gas chamber 30. The second electrode 13 is arranged between the first solid electrolyte layer 12 and the second solid electrolyte layer 14. The third electrode 15 is arranged on the surface of the second solid electrolyte layer 14 at the opposite side to the first solid electrolyte layer 12 and the second electrode 13. The first electrode 11 and the second electrode 13 are arranged to face each other through the first solid electrolyte layer 12. The second electrode 13 and the third electrode 15 are arranged to face each other through the second solid electrolyte layer 14. The first electrode 11, second electrode 13, and third electrode 15 are, for example, porous cermet electrodes containing at least one of platinum (Pt), rhodium (Rh), and palladium (Pd) as a main constituent.

The sensor element 2 is provided with a sensor cell 10 and pump cell 20. The sensor cell 10 is an electrochemical cell having the first electrode 11, the first solid electrolyte layer 12, and the second electrode 13. The pump cell 20 is an electrochemical cell having the second electrode 13, second solid electrolyte layer 14, and third electrode 15. The second electrode 13 is shared by the sensor cell 10 and pump cell 20.

The air-fuel ratio detection device 1 is further provided with a first voltage application circuit 40 and first current detector 42 connected to the sensor cell 10, and a second voltage application circuit 50 and second current detector 52 connected to the pump cell 20. The first voltage application circuit 40 is provided with a first power source 41. The first voltage application circuit 40 applies voltage to the sensor cell 10 so that the potential of the second electrode 13 becomes higher than the potential of the first electrode 11. Therefore, the first electrode 11 functions as a negative electrode while the second electrode 13 functions as a positive electrode. The first current detector 42 detects the current flowing through the first solid electrolyte layer 12 between the first electrode 11 and the second electrode 13, that is, the output current of the sensor cell 10.

The second voltage application circuit 50 is provided with a second power source 51. The second voltage application circuit 50 applies voltage to the pump cell 20 so that the potential of the second electrode 13 becomes higher than the potential of the third electrode 15. Therefore, the third electrode 15 functions as a negative electrode while the second electrode 13 functions as a positive electrode. The second current detector 52 detects the current flowing through the second solid electrolyte layer 14 between the second electrode 13 and the third electrode 15, that is, the output current of the pump cell 20.

As explained above, the first solid electrolyte layer 12 and the second solid electrolyte layer 14 have oxide ion conductivity. For this reason, if a difference in concentration of oxygen occurs between the two side surfaces of the first solid electrolyte layer 12, oxide ions move from the high concentration side surface side to the low concentration side surface side. Similarly, if a difference in concentration of oxygen occurs between the two side surfaces of the second solid electrolyte layer 14, oxide ions move from the high concentration side surface side to the low concentration side surface side. This characteristic is called the "oxygen cell characteristic".

Further, if a potential difference is given between the two side surfaces of the first solid electrolyte layer 12, oxide ions move so that an oxygen concentration ratio corresponding to the potential difference arises. Similarly, if a potential difference is given between the two side surfaces of the second solid electrolyte layer 14, oxide ions move so that an oxygen concentration ratio corresponding to the potential difference arises. This characteristic is called the "oxygen pumping characteristic".

For this reason, if voltage is applied to the pump cell 20 so that the potential of the second electrode 13 becomes higher than the potential of the third electrode 15, oxide ions move from the third electrode 15 through the second solid electrolyte layer 14 to the second electrode 13. As a result, the current flows in a reverse direction from the oxide ions and flows from the second electrode 13 through the second solid electrolyte layer 14 to the third electrode 15.

The second voltage application circuit 50 controls by feedback the voltage applied to the pump cell 20 based on the output of the second current detector 52 so that the output current of the pump cell 20 becomes a predetermined value. As a result, the output current of the pump cell 20 is maintained constant and in turn the concentration of oxygen on the second electrode 13 is maintained constant. By doing this, it is possible to maintain the concentration of oxygen on the second electrode 13 constant without exposing the second electrode 13 to the atmosphere using an atmospheric duct and possible to make the sensor element 2 smaller in size.

Further, in the sensor element 2, the second electrode 13 is gripped between the first solid electrolyte layer 12 and the second solid electrolyte layer 14. There is no space between the first solid electrolyte layer 12 and the second solid electrolyte layer 14. In addition, the sensor element 2 is not provided with a heater for heating the sensor element 2. Due to these, smaller size of the sensor element 2 can be further promoted.

When the air-fuel ratio of the exhaust gas flowing into the measured gas chamber 30 is leaner than the stoichiometric air-fuel ratio, the concentration of oxygen in the exhaust gas is high. As a result, the concentration of oxygen on the first electrode 11 becomes higher and the oxygen concentration ratio between the two side surfaces of the first solid electrolyte layer 12 becomes lower. For this reason, if a suitable voltage is applied to the sensor cell 10, the oxygen concentration ratio between the two side surfaces of the first solid electrolyte layer 12 becomes lower than the oxygen concentration ratio corresponding to the voltage. As a result, the oxygen gas on the first electrode 11 is decomposed so that the oxygen concentration ratio between the two side surfaces of the first solid electrolyte layer 12 approaches the oxygen concentration ratio corresponding to the voltage and oxide ions move from the first electrode 11 to the second electrode 13. In this case, current flows from the second electrode 13 to the first electrode 11 and a positive current is detected by the first current detector 42. The current becomes larger the higher the concentration of oxygen in the exhaust gas flowing into the measured gas chamber 30, that is, the leaner the air-fuel ratio of the exhaust gas.

On the other hand, when the air-fuel ratio of the exhaust gas flowing into the measured gas chamber 30 is richer than the stoichiometric air-fuel ratio, the oxygen on the first electrode 11 is removed by reacting with the unburned gas in the exhaust gas. As a result, the concentration of oxygen on the first electrode 11 becomes lower and the oxygen concentration ratio between the two side surfaces of the first solid electrolyte layer 12 becomes higher. For this reason, if a suitable voltage is applied to the sensor cell 10, the oxygen concentration ratio between the two side surfaces of the first solid electrolyte layer 12 becomes higher than the oxygen concentration ratio corresponding to the voltage. As a result, oxide ions move from the second electrode 13 to the first electrode 11 so that the oxygen concentration ratio between the two side surfaces of the first solid electrolyte layer 12 approaches an oxygen concentration ratio corresponding to the voltage, and unburned gas on the first electrode 11 is oxidized. In this case, current flows from the first electrode 11 to the second electrode 13 and negative current is detected by the first current detector 42. The absolute value of the current becomes larger the higher the concentration of unburned gas in the exhaust gas flowing into the measured gas chamber 30, that is, becomes larger the richer the air-fuel ratio of the exhaust gas.

Further, when the air-fuel ratio of the exhaust gas flowing into the measured gas chamber 30 is the stoichiometric air-fuel ratio (in the present embodiment, 14.6), the amounts of the oxygen and unburned gas in the exhaust gas become the chemical equivalent ratio. As a result, the two are completely burned by the catalytic action of the first electrode 11, and the oxygen concentration ratio between the two side surfaces of the first solid electrolyte layer 12 is maintained at the oxygen concentration ratio corresponding to the voltage. For this reason, no movement of the oxide ions occurs due to the oxygen pumping characteristic and the current detected by the first current detector 42 becomes zero.

Figure 2:
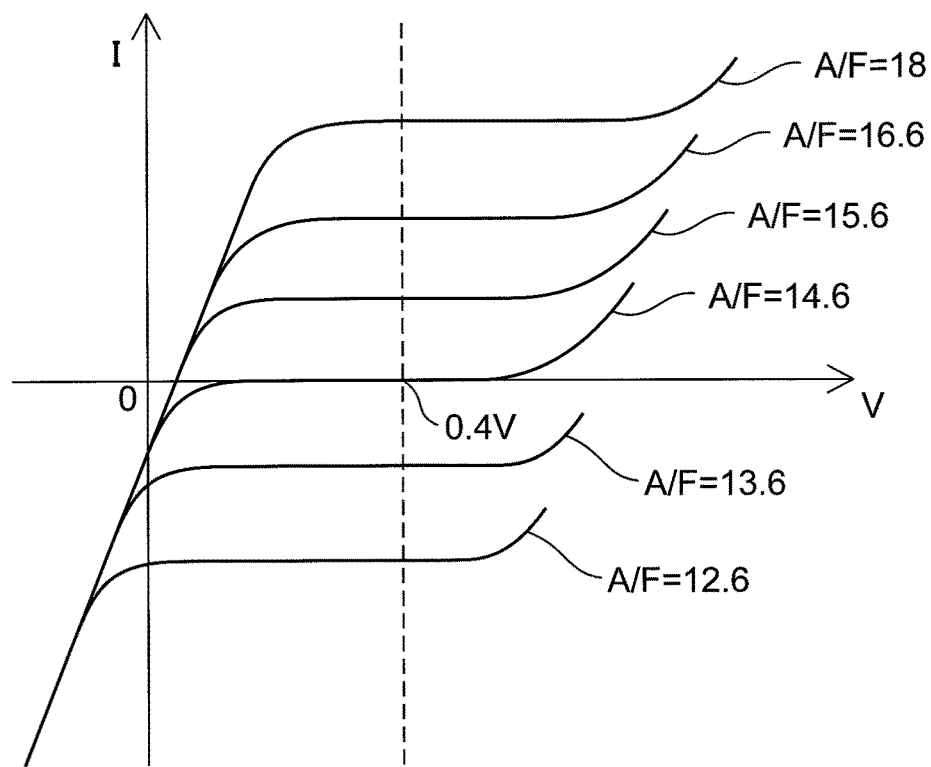
FIG. 2 is a view showing voltage-current (V-I) characteristics of a sensor cell.

FIG. 2 is a view showing voltage-current (V-I) characteristics of the sensor cell 10. FIG. 2 shows the voltage-current (V-I) characteristics of the sensor cell 10 for different air-fuel ratios (A/F). The abscissa of FIG. 2 shows a voltage V applied to the sensor cell 10, while the ordinate of FIG. 2 shows an output current I of the sensor cell 10. As shown in FIG. 2, in the region where the voltage V is low, if the air-fuel ratio is constant, the output current I becomes greater the higher the voltage V becomes. The voltage region where the output current I changes proportionally to the voltage V is called the "proportional region".

In the proportional region, the voltage V is low, so the amount of flow of oxide ions able to move through the first solid electrolyte layer 12 is small. In this case, when voltage is applied to the sensor cell 10, the speed of movement of oxide ions moving through the first solid electrolyte layer 12 becomes slower than the speed of introduction of exhaust gas introduced through the diffusion regulating layer 16 to the measured gas chamber 30. For this reason, the amount of flow of oxide ions able to move through the first solid electrolyte layer 12 changes according to the voltage V, and the output current I increases along with the increase in the voltage V.

As shown in FIG. 2, if the voltage V becomes equal to or more than a predetermined value, the output current I is maintained at a substantially constant value regardless of the value of the voltage V. This saturated current is called the "limit current", while the voltage region where the limit current occurs is called the "limit current region". At the "limit current region", the voltage V is higher than the proportional region, so the amount of flow of oxide ions able to move through the first solid electrolyte layer 12 becomes greater than the proportional region. In this case, the speed of movement of oxide ions moving through the first solid electrolyte layer 12 when voltage is applied to the sensor cell 10 becomes faster than the speed of introduction of exhaust gas introduced through the diffusion regulating layer 16 to the measured gas chamber 30. For this reason, the amount of flow of oxide ions able to move through the first solid electrolyte layer 12 does not change much at all corresponding to the voltage V, so the output current I is maintained at a substantially constant value regardless of the value of the voltage V.

On the other hand, the amount of flow of oxide ions moving through the first solid electrolyte layer 12 changes in accordance with the oxygen concentration ratio between the two side surfaces of the first solid electrolyte layer 12, so the limit current changes in accordance with the air-fuel ratio. Specifically, the limit current becomes larger the leaner the air-fuel ratio. Further, the limit current becomes zero when the air-fuel ratio is the stoichiometric air-fuel ratio, becomes positive when the air-fuel ratio is lean, and becomes negative when the air-fuel ratio is rich.

Further, as shown in FIG. 2, in the region where the voltage V is extremely high, if the air-fuel ratio is constant, the output current I becomes larger as the voltage V becomes higher. If the voltage V becomes extremely high, water in the exhaust gas is decomposed at the first electrode 11. The oxide ions generated due to decomposition of water move through the first solid electrolyte layer 12 from the first electrode 11 to the second electrode 13. As a result, the current generated due to the decomposition of water is also detected as the output current I, so the output current I becomes larger than the limit current. This voltage region is called the "water decomposition region".

Figure 3:
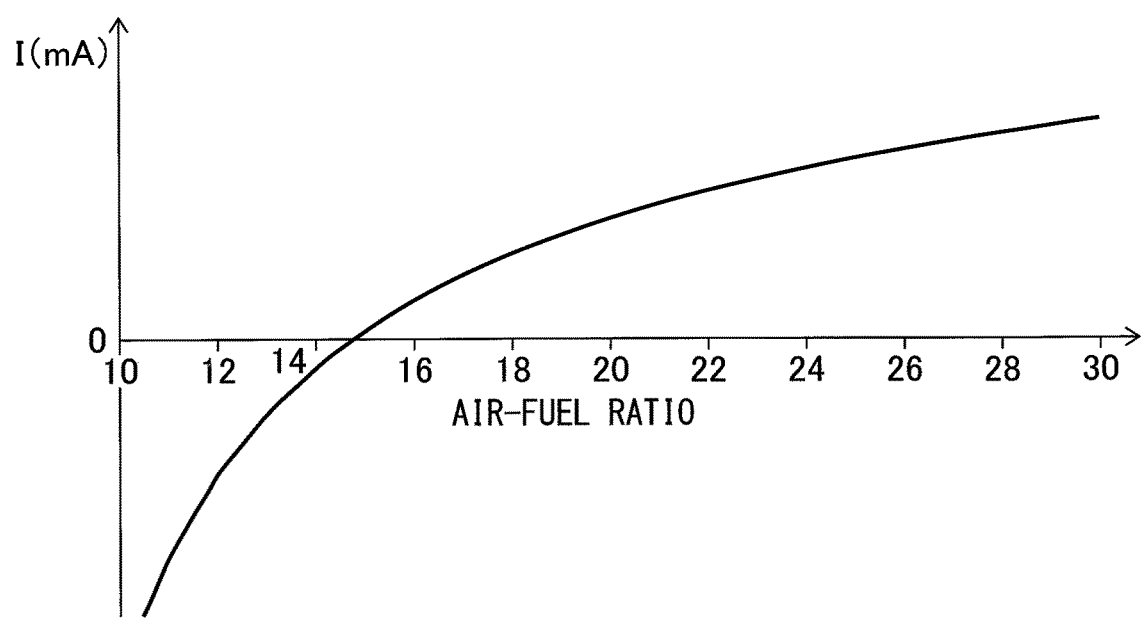
FIG. 3 is a view showing a relationship of an output current of the sensor cell and an air-fuel ratio.

FIG. 3 is a view showing the relationship between the output current I of the sensor cell 10 and the air-fuel ratio. In the example of FIG. 3, a 0.4V voltage within the limit current region is applied to the sensor cell 10. As shown in FIG. 3, the output current I changes in accordance with the air-fuel ratio and becomes greater the leaner the air-fuel ratio. For this reason, it is possible to detect the output current I to detect the air-fuel ratio.

<Method of Detection of Air-Fuel Ratio>

Figure 4:
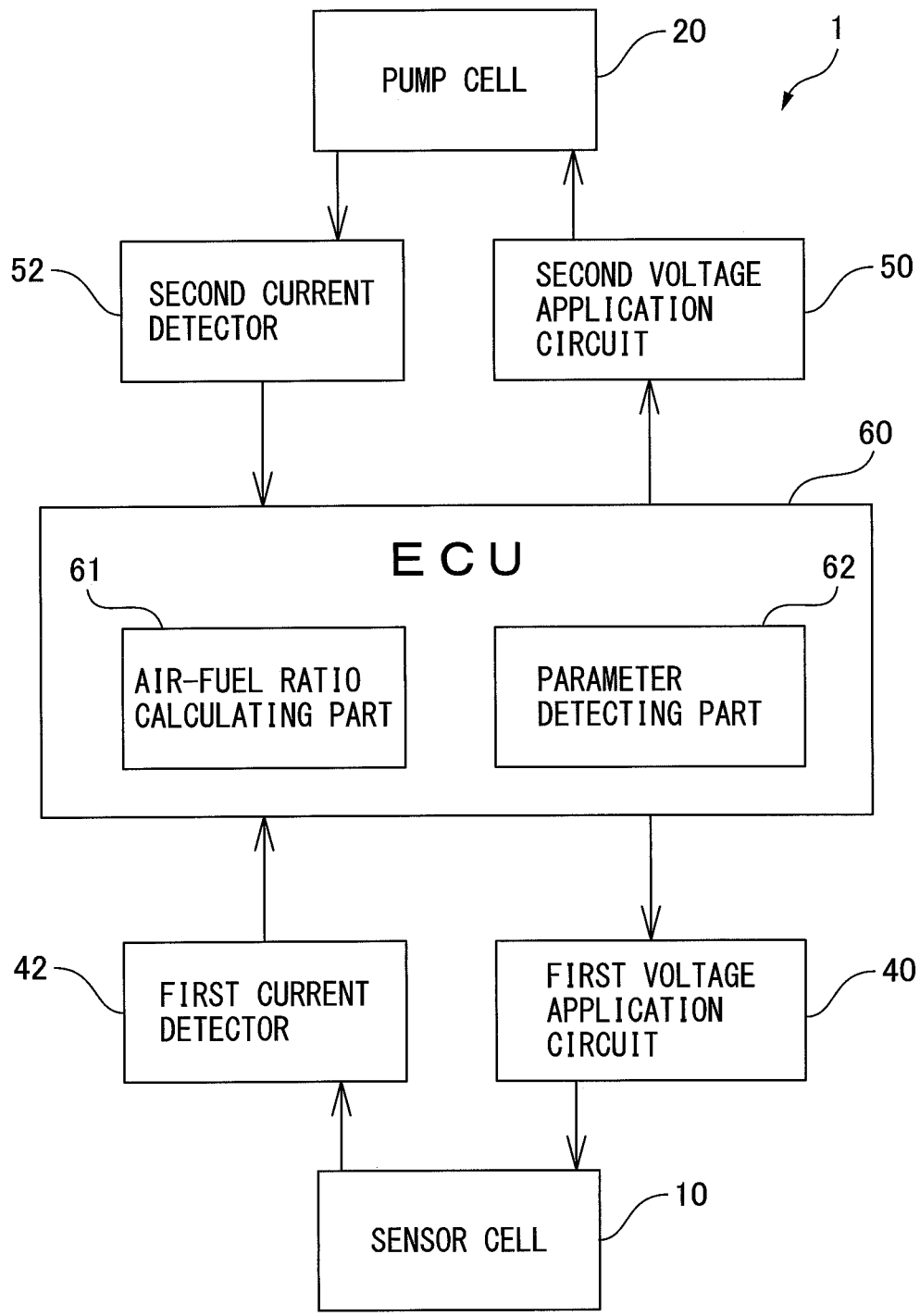
FIG. 4 is a block diagram schematically showing a configuration of an air-fuel ratio detection device according to the first embodiment.

FIG. 4 is a block diagram schematically showing the configuration of the air-fuel ratio detection device according to the first embodiment. The air-fuel ratio detection device 1 is further provided with an air-fuel ratio calculating part 61 and a parameter detecting part 62. The air-fuel ratio calculating part 61 calculates an air-fuel ratio. The parameter detecting part 62 detects or calculates a temperature correlation parameter correlated with the temperature of the sensor element 2. The temperature correlation parameter is the temperature of the sensor element 2, an impedance of the sensor cell 10, an impedance of the pump cell 20, etc.

In the present embodiment, the ECU 60 functions as the air-fuel ratio calculating part 61 and the parameter detecting part 62. The ECU 60 is provided with a memory such as a read only memory (ROM) and random access memory (RAM), central processing unit (CPU), input port, output port, communication module, etc.

The first voltage application circuit 40 and the first current detector 42 are connected to the ECU 60. The ECU 60 controls the voltage applied to the sensor cell 10 through the first voltage application circuit 40. Further, the ECU 60 acquires the output current of the sensor cell 10 detected by the first current detector 42 from the first current detector 42.

The second voltage application circuit 50 and the second current detector 52 are connected to the ECU 60. The ECU 60 controls the voltage applied to the pump cell 20 through the second voltage application circuit 50. Further, the ECU 60 acquires the output current of the pump cell 20 detected by the second current detector 52 from the second current detector 52.

As explained above, the output current of the sensor cell 10 changes according to the air-fuel ratio, so it is possible to detect the output current of the sensor cell 10 to detect the air-fuel ratio. However, the sensor element 2 is not provided with a heater, so the temperature of the sensor element 2 changes according to the temperature of the exhaust gas etc.

Figure 5:
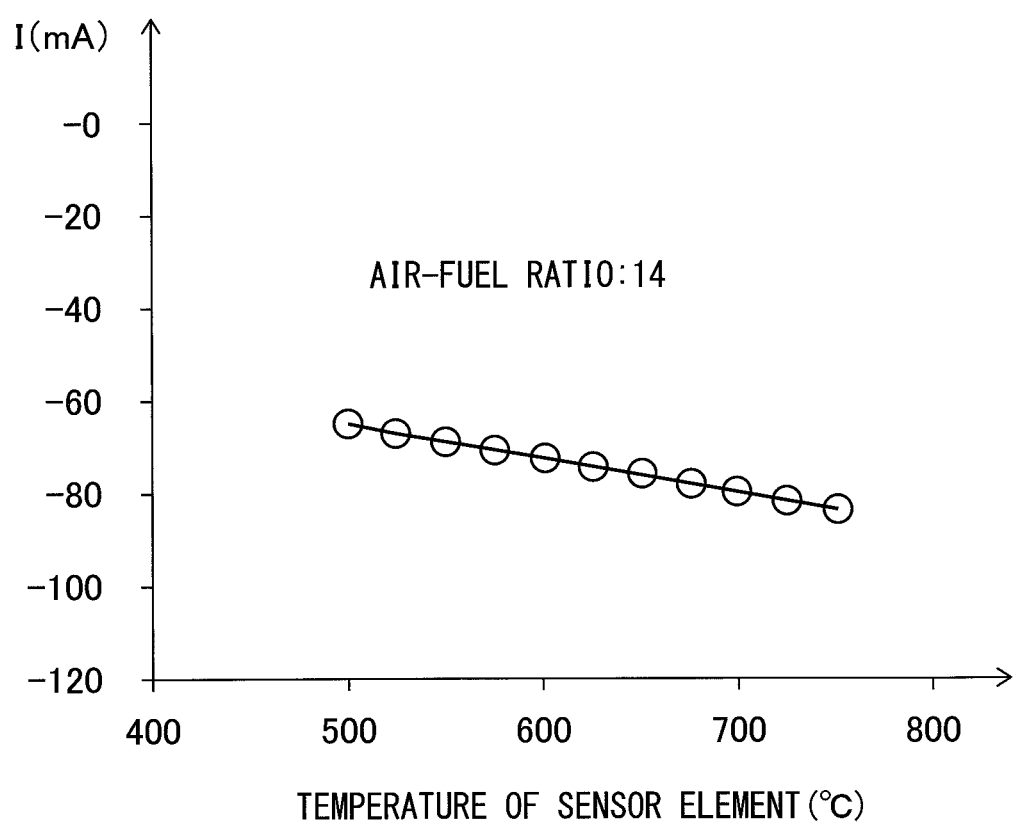
FIG. 5 is a view showing a relationship of a temperature of a sensor element and an output current of the sensor cell.

FIG. 5 is a view showing the relationship between a temperature of the sensor element 2 and an output current of the sensor cell 10. In the example of FIG. 5, when the air-fuel ratio is a value (14) richer than the stoichiometric air-fuel ratio, a 0.4V voltage within the limit current region is applied to the sensor cell 10. The air-fuel ratio is richer than the stoichiometric air-fuel ratio, so the output current of the sensor cell 10 becomes negative. As shown in FIG. 5, the absolute value of the output current of the sensor cell 10 becomes larger the higher the temperature of the sensor element 2. Therefore, if the temperature of the sensor element 2 changes, the value of the output current corresponding to the predetermined air-fuel ratio also changes. For this reason, if the air-fuel ratio is calculated based on only the output current of the sensor cell 10, the precision of detection of the air-fuel ratio falls when the temperature of the sensor element 2 fluctuates.

Therefore, in the present embodiment, the air-fuel ratio calculating part 61 calculates the air-fuel ratio based on the temperature correlation parameter and the output current of the sensor cell 10 detected when a predetermined voltage is applied to the sensor cell 10. By doing this, since the temperature of the sensor element 2 is considered in calculating the air-fuel ratio, it is possible to keep the precision of detection of the air-fuel ratio from falling when the temperature of the sensor element 2 fluctuates.

<Processing for Detecting Air-Fuel Ratio>

Figure 6:
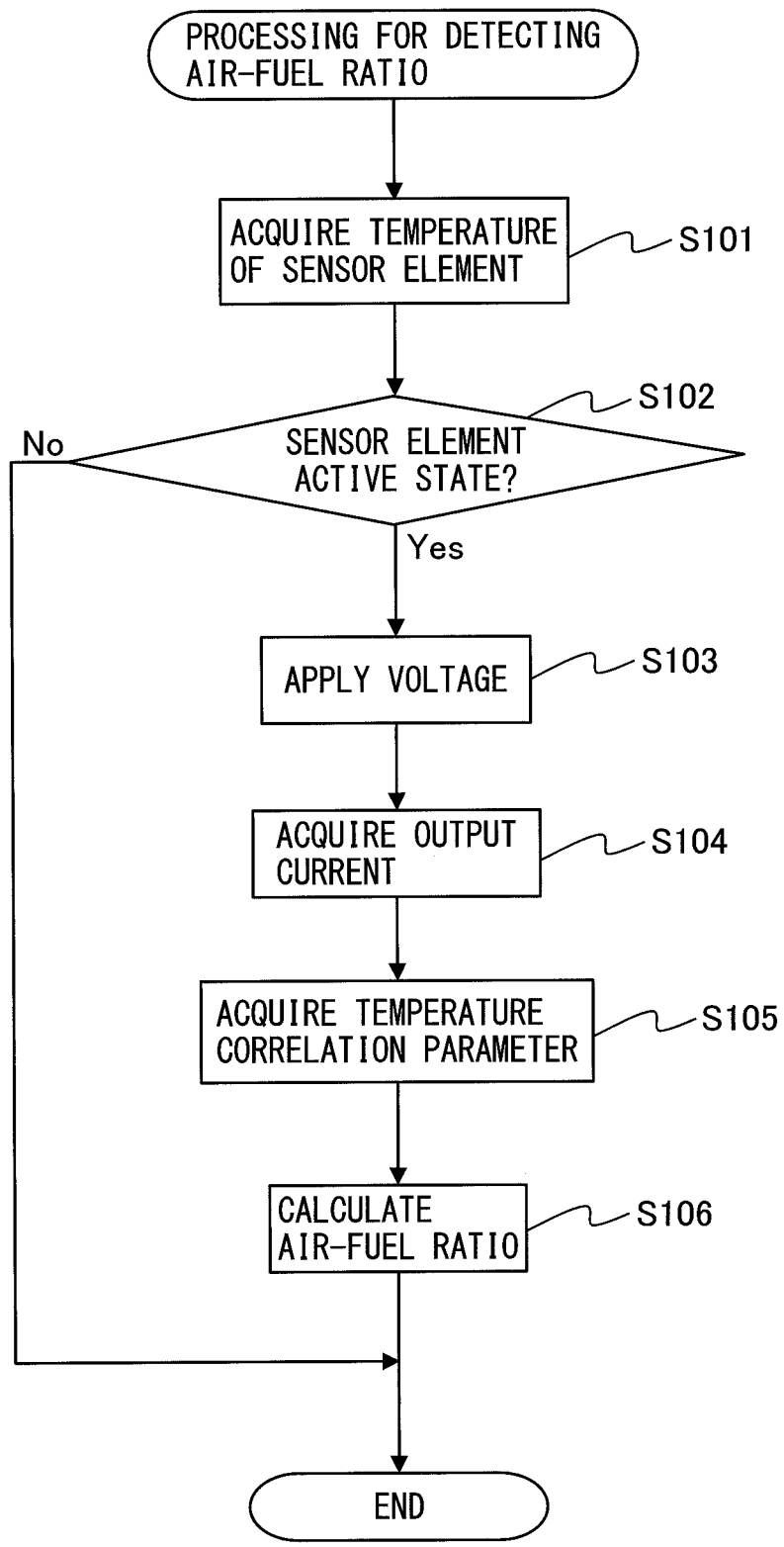
FIG. 6 is a flow chart showing a control routine of processing for detecting an air-fuel ratio in the first embodiment of the present invention.

FIG. 6 is a flow chart showing a control routine of processing for detecting an air-fuel ratio in the first embodiment of the present invention. The present control routine is performed, after the startup of the internal combustion engine, by the ECU 60 at predetermined time intervals. In the present control routine, the sensor element 2 is used to detect the air-fuel ratio.

First, at step S101, the air-fuel ratio calculating part 61 acquires the temperature of the sensor element 2. The temperature of the sensor element 2 is detected or calculated by the parameter detecting part 62. For example, the parameter detecting part 62 detects the temperature of the sensor element 2 using a thermistor, thermocouple, etc., provided at the sensor element 2.

Figure 7:
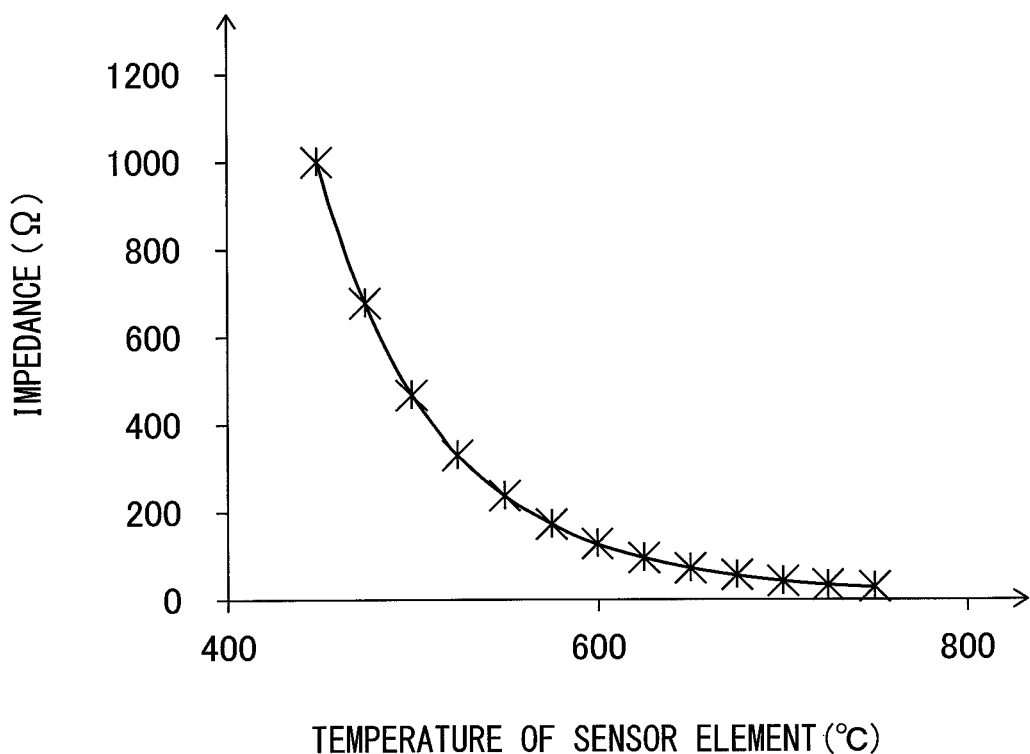
FIG. 7 is a view showing a relationship of an impedance of the sensor cell and a temperature of the sensor element.

Further, as shown in FIG. 7, the impedance of the sensor cell 10 is correlated with the temperature of the sensor element 2. For this reason, the parameter detecting part 62 may use a 2D map such as shown in FIG. 7 to calculate the temperature of the sensor element 2 from the impedance of the sensor cell 10. The impedance is calculated by a known technique and is calculated based on the voltage and the output current of the sensor cell when making the voltage applied to the sensor cell 10 fluctuate. For example, the range of fluctuation of the voltage is 0.4V±0.2V and the frequency of the applied voltage is equal to or more than 5 kHz. Note that, the impedance of the pump cell 20 may be detected and the temperature of the sensor element 2 may be calculated based on the impedance of the pump cell 20.

Next, at step S102, the air-fuel ratio calculating part 61 judges whether the sensor element 2 is in the active state. The air-fuel ratio calculating part 61 judges that the sensor element 2 is in the active state when the temperature of the sensor element 2 is equal to or more than a predetermined activation temperature. On the other hand, the air-fuel ratio calculating part 61 judges that the sensor element 2 is not in the active state if the temperature of the sensor element 2 is less than the activation temperature.

If at step S102 it is judged that the sensor element 2 is not in the active state, the present control routine ends. On the other hand, if at step S102 it is judged that the sensor element 2 is in the active state, the present control routine proceeds to step S103. At step S103, the air-fuel ratio calculating part 61 applies voltage within the limit current region through the first voltage application circuit 40 to the sensor cell 10. The voltage within the limit current region is 0.2V to 0.6V, for example, is 0.4V. Note that, so long as the output current of the sensor cell 10 changes according to the air-fuel ratio, a voltage outside the limit current region may be applied to the sensor cell 10. On the other hand, at the pump cell 20, after startup of the internal combustion engine, voltage is applied to the pump cell 20 so that the output current of the pump cell 20 becomes a predetermined value (for example 200 μA).

Next, at step S104, the air-fuel ratio calculating part 61 acquires the output current of the sensor cell 10. The output current of the sensor cell 10 is detected by the first current detector 42. Note that, the air-fuel ratio calculating part 61 may acquire the average value of a plurality of output currents detected by the first current detector 42.

Next, at step S105, the air-fuel ratio calculating part 61 acquires the temperature correlation parameter. The temperature correlation parameter is detected or calculated by the parameter detecting part 62. The temperature correlation parameter is, for example, the temperature of the sensor element 2. In this case, the parameter detecting part 62 detects or calculates the temperature of the sensor element 2 in the same way as at step S101.

Figure 8:
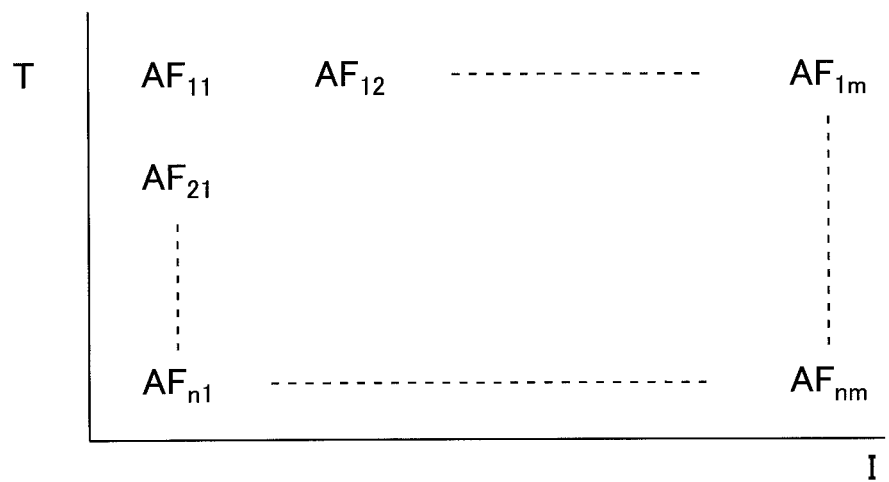
FIG. 8 is a 3D map showing a relationship of a temperature correlation parameter and output current and air-fuel ratio.

Next, at step S106, the air-fuel ratio calculating part 61 calculates the air-fuel ratio based on the temperature correlation parameter acquired at step S105 and the output current acquired at step S104. Specifically, the air-fuel ratio calculating part 61 uses a 3D map such as shown in FIG. 8 to calculate the air-fuel ratio. In this map, the air-fuel ratio AF is shown as a function of the temperature correlation parameter T and output current I. The map is prepared so that when the temperature correlation parameter T is constant, the larger the output current I, the leaner the air-fuel ratio AF. Further, the map is prepared so that when the output current I is constant, the lower the temperature correlation parameter T, the larger the difference of the air-fuel ratio AF and the stoichiometric air-fuel ratio becomes. After step S106, the present control routine ends.

Note that, the temperature correlation parameter may be the impedance of the sensor cell 10 or pump cell 20. In this case, the map at step S106 is prepared so that when the output current I is constant, the higher the temperature correlation parameter T, the larger the difference between the air-fuel ratio AF and the stoichiometric air-fuel ratio becomes. Further, if the temperature correlation parameter is the temperature of the sensor element 2, step S105 may be omitted and, at step S106, the temperature of the sensor element 2 acquired at step S101 may be used as the temperature correlation parameter.

Second Embodiment

The air-fuel ratio detection device according to a second embodiment is basically similar in constitution and control to the air-fuel ratio detection device according to the first embodiment except for the points explained below. For this reason, below, the second embodiment of the present invention will be explained focusing on the parts different from the first embodiment.

When the temperature of the sensor element 2 is constant, the air-fuel ratio and the output current of the sensor cell 10 have the relationship such as shown in FIG. 3. As explained above, if the temperature of the sensor element 2 fluctuates, the value of the output current of the sensor cell 10 corresponding to the predetermined air-fuel ratio also fluctuates. For this reason, in order to use the 2D map such as shown in FIG. 3 to precisely calculate the air-fuel ratio, it is necessary to correct the output current of the sensor cell 10 based on the temperature correlation parameter of the sensor element 2.

Therefore, in the second embodiment, the air-fuel ratio calculating part 61 converts the output current to a value corresponding to a reference value of the temperature correlation parameter based on the temperature correlation parameter and calculates the air-fuel ratio from the converted value using the relationship of the output current and the air-fuel ratio at a reference value. The reference value is determined in advance.

Figure 9:
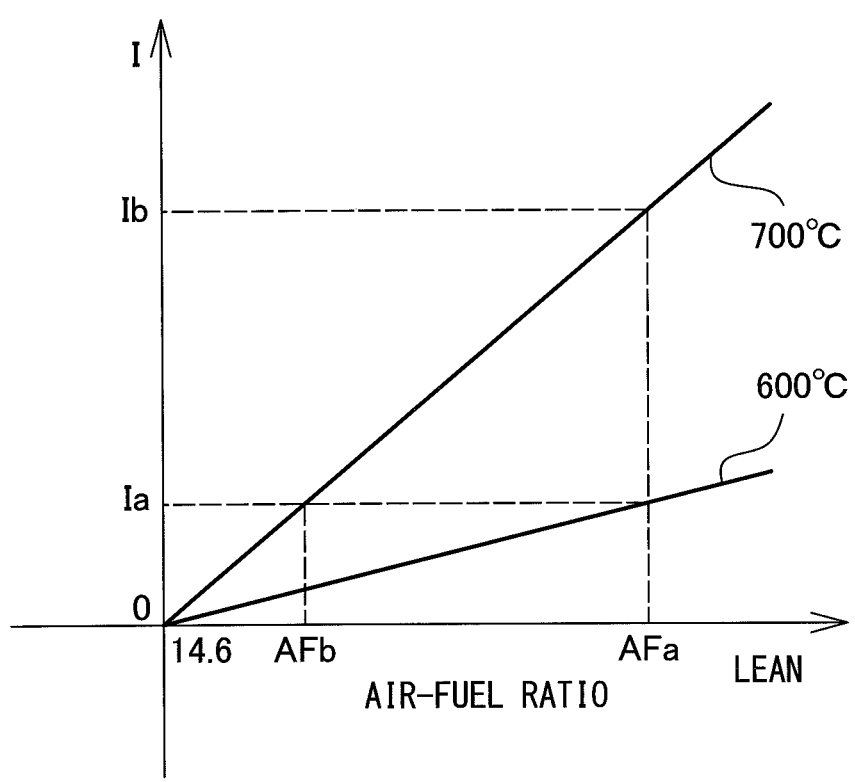
FIG. 9 is a view showing a relationship of an output current and air-fuel ratio when the air-fuel ratio is leaner than a stoichiometric air-fuel ratio and near the stoichiometric air-fuel ratio.

FIG. 9 is a view showing the relationship between the output current I and the air-fuel ratio when the air-fuel ratio is leaner than the stoichiometric air-fuel ratio and near the stoichiometric air-fuel ratio. FIG. 9 shows the relationship between the output current I and the air-fuel ratio when the temperature of the sensor element 2 is 600° C. and the relationship between the output current I and the air-fuel ratio when the temperature of the sensor element 2 is 700° C. In the example of FIG. 9, a 0.4V voltage within the limit current region is applied to the sensor cell 10.

As will be understood from FIG. 3 and FIG. 9, when the air-fuel ratio is near the stoichiometric air-fuel ratio, the output current I linearly changes with respect to the air-fuel ratio and the relationship between the output current I and the air-fuel ratio is approximated by a primary line. In this case, the slant of the primary line changes in accordance with the temperature of the sensor element 2. In the example of FIG. 9, when the air-fuel ratio is AFa and the temperature of the sensor element 2 is 600° C., the output current becomes Ia. It is necessary to correct this output current Ia to convert it to the output current Ib at a reference value (in the example of FIG. 9, 700° C.).

As will be understood from FIG. 9, the ratio of the output current at a reference value with respect to output current at a predetermined temperature when the air-fuel ratio is a predetermined value (in example of FIG. 9, Ib/Ia) becomes substantially constant regardless of the air-fuel ratio. For this reason, it is possible to multiply this ratio with the output current as the correction coefficient to thereby convert the output current to a value corresponding to a reference value.

Therefore, in the second embodiment, the air-fuel ratio calculating part 61 multiplies the correction coefficient corresponding to the temperature correlation parameter with the output current to thereby convert the output current to a value corresponding to a reference value of the temperature correlation parameter. By doing this, it is possible to precisely calculate the air-fuel ratio without using a 3D map such as shown in FIG. 8 and possible to reduce the number of steps for preparing a 3D map and reduce the size of the memory of the ECU 60.

Note that, sometimes the ratio of the output current at different temperatures will change the further the air-fuel ratio from the stoichiometric air-fuel ratio. However, even if the air-fuel ratio is a value separate from the stoichiometric air-fuel ratio, it is possible to use a correction coefficient determined in advance based on the ratio of the output current near the stoichiometric air-fuel ratio to make the output current at a predetermined temperature correlation parameter approach a value corresponding to a reference value. Further, in normal operation of an internal combustion engine, the air-fuel ratio is basically maintained near the stoichiometric air-fuel ratio so as to keep the exhaust emissions from deteriorating. For this reason, it is possible to use a correction coefficient determined in advance based on the ratio of the output current near the stoichiometric air-fuel ratio to precisely convert the output current.

<Processing for Detecting Air-Fuel Ratio>

Figure 10:
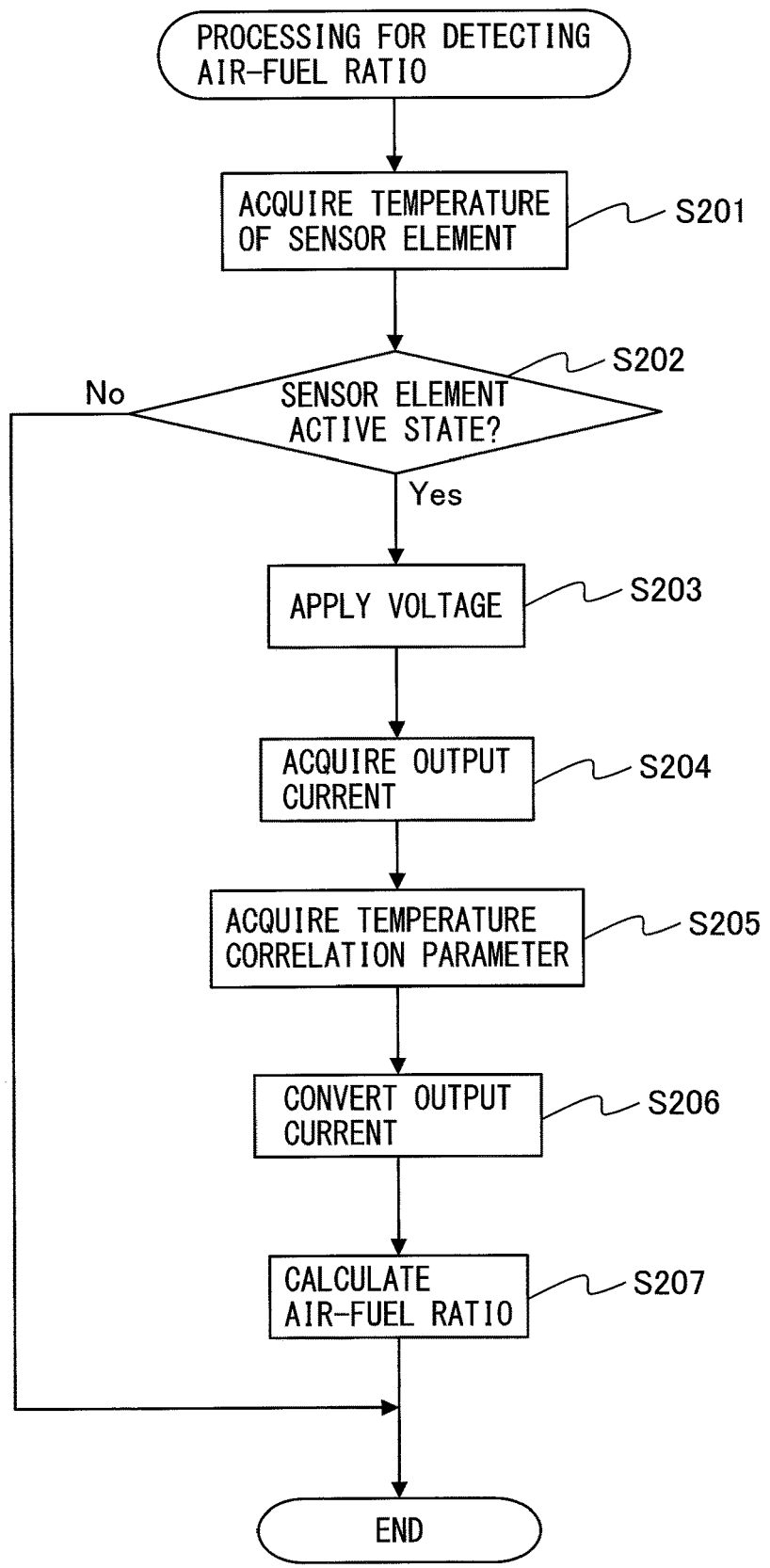
FIG. 10 is a flow chart showing a control routine of processing for detecting an air-fuel ratio in a second embodiment of the present invention.

FIG. 10 is a flow chart showing a control routine of processing for detecting an air-fuel ratio in the second embodiment of the present invention. The present control routine is performed, after the startup of the internal combustion engine, by the ECU 60 at predetermined time intervals. In the present control routine, the sensor element 2 is used to detect the air-fuel ratio.

Step S201 to step S205 are similar to step S101 to step S105 of FIG. 6, so explanations will be omitted. After step S205, at step S206, the air-fuel ratio calculating part 61 converts the output current acquired at step S204 to a value corresponding to a reference value of the temperature correlation parameter. Specifically, the air-fuel ratio calculating part 61 multiplies the correction coefficient corresponding to the temperature correlation parameter acquired at step S205 with the output current acquired at step S204 (output current after conversion=output current before conversion× correction coefficient).

Figure 11:
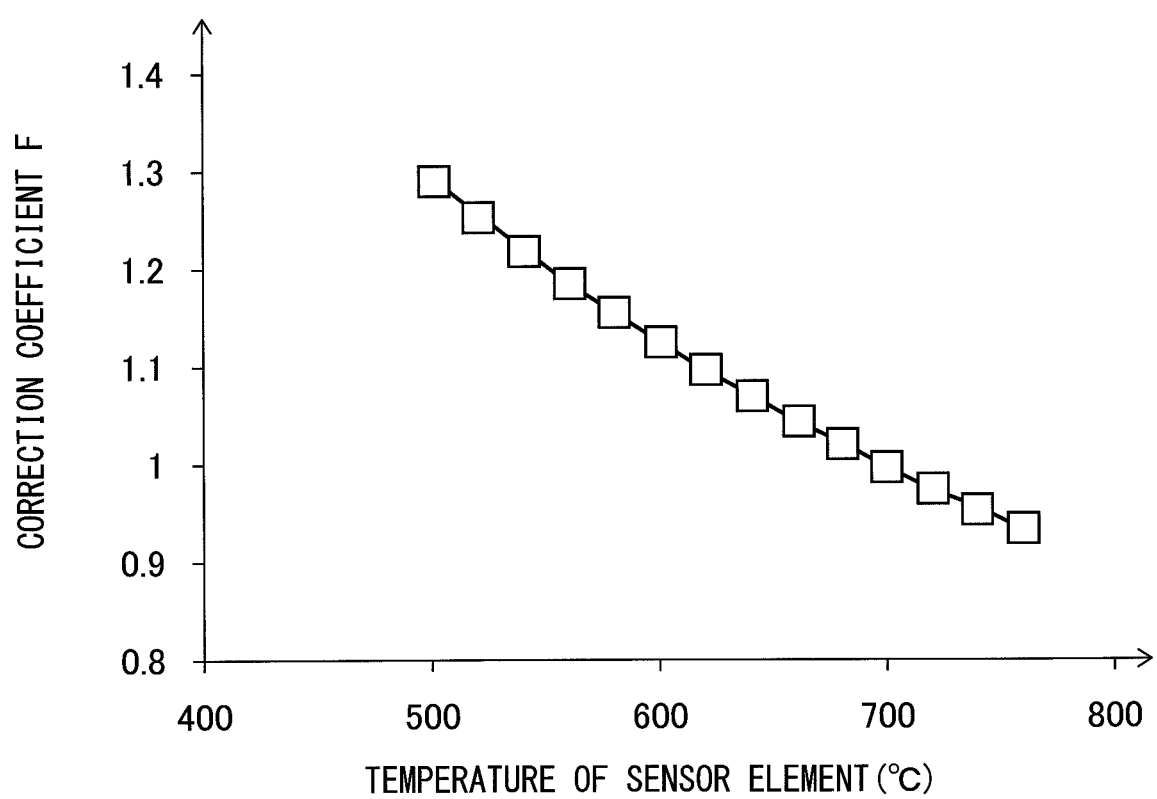
FIG. 11 is a view showing a relationship of a temperature of the sensor element and a correction coefficient.

The correction coefficient is determined in advance for each temperature correlation parameter and is calculated as the ratio of the output current at a reference value of the temperature correlation parameter to the output current at each temperature correlation parameter when the air-fuel ratio is a predetermined value (correction coefficient=current at reference value/output current at each temperature correlation parameter). For example, when the temperature correlation parameter is the temperature of the sensor element 2, the relationship of the temperature of the sensor element 2 and the correction coefficient becomes as in FIG. 11. FIG. 11 is a view showing the relationship of the temperature of the sensor element 2 and the correction coefficient F. In the example of FIG. 11, the reference value of the temperature correlation parameter is 700° C. For this reason, the correction coefficient F corresponding to 700° C. becomes "1". The correction coefficient F in FIG. 11 is calculated using the relationship between the temperature of the sensor element 2 and the output current I when the air-fuel ratio is 14 (FIG. 5). The correction coefficient F becomes larger the lower the temperature of the sensor element 2.

Next, at step S207, the air-fuel ratio calculating part 61 calculates the air-fuel ratio from the value of the output current converted at step S206. Specifically, the air-fuel ratio calculating part 61 uses a two-dimensional map such as shown in FIG. 3 in which the relationship between the output current I and the air-fuel ratio at a reference value of the temperature correlation parameter is shown to calculate the air-fuel ratio from the value of the output current after conversion. After step S207, the present control routine ends.

Note that, the temperature correlation parameter may be the impedance of the sensor cell 10 or pump cell 20. In this case, the correction coefficient at step S206 becomes larger the higher the temperature correlation parameter. Further, when the temperature correlation parameter is the temperature of the sensor element 2, step S205 may be omitted and at step S206 the temperature of the sensor element 2 acquired at step S201 may be used as the temperature correlation parameter. Further, at step S206, the air-fuel ratio calculating part 61 uses a three-dimensional map in which the output current after conversion is shown as a function of the temperature correlation parameter and output current before conversion to convert the output current.

Third Embodiment

The air-fuel ratio detection device according to a third embodiment is basically similar in constitution and control to the air-fuel ratio detection device according to the second embodiment except for the points explained below. For this reason, below, the third embodiment of the present invention will be explained focusing on the parts different from the second embodiment.

As explained above, when the air-fuel ratio is leaner than the stoichiometric air-fuel ratio, oxygen gas is decomposed on the first electrode 11 and oxide ions move from the first electrode 11 to the second electrode 13. As a result, a positive current is detected by the first current detector 42. On the other hand, when the air-fuel ratio is richer than the stoichiometric air-fuel ratio, oxide ions move from the second electrode 13 to the first electrode 11 and unburned gas is oxidized on the first electrode 11. As a result, a negative current is detected by the first current detector 42.

In this way, the mechanisms by which the output current of the sensor cell 10 is generated differ between when the air-fuel ratio is leaner than the stoichiometric air-fuel ratio, that is, when the output current of the sensor cell 10 is positive, and when the air-fuel ratio is richer than the stoichiometric air-fuel ratio, that is, when the output current of the sensor cell 10 is negative. For this reason, even if the air-fuel ratio is near the stoichiometric air-fuel ratio, the ratio of the output current at different temperatures is liable to change depending on the sign of the output current. In actuality, as shown in FIG. 3, when the output current of the sensor cell 10 is positive, compared to when the output current of the sensor cell 10 is negative, the amount of change of the output current with respect to the air-fuel ratio (slant of graph of FIG. 3) becomes smaller.

Therefore, in the third embodiment, the correction coefficient used for converting the output current of the sensor cell 10 to a value corresponding to a reference value of the temperature correlation parameter is set to a value different for each sign of the output current. By doing this, the correction coefficient is set to a more suitable value, so it is possible to raise the precision of conversion of the output current and in turn possible to suppress much more a drop in the precision of detection of the air-fuel ratio when the temperature of the sensor element 2 fluctuates.

<Processing for Detecting Air-Fuel Ratio>

Figure 12:
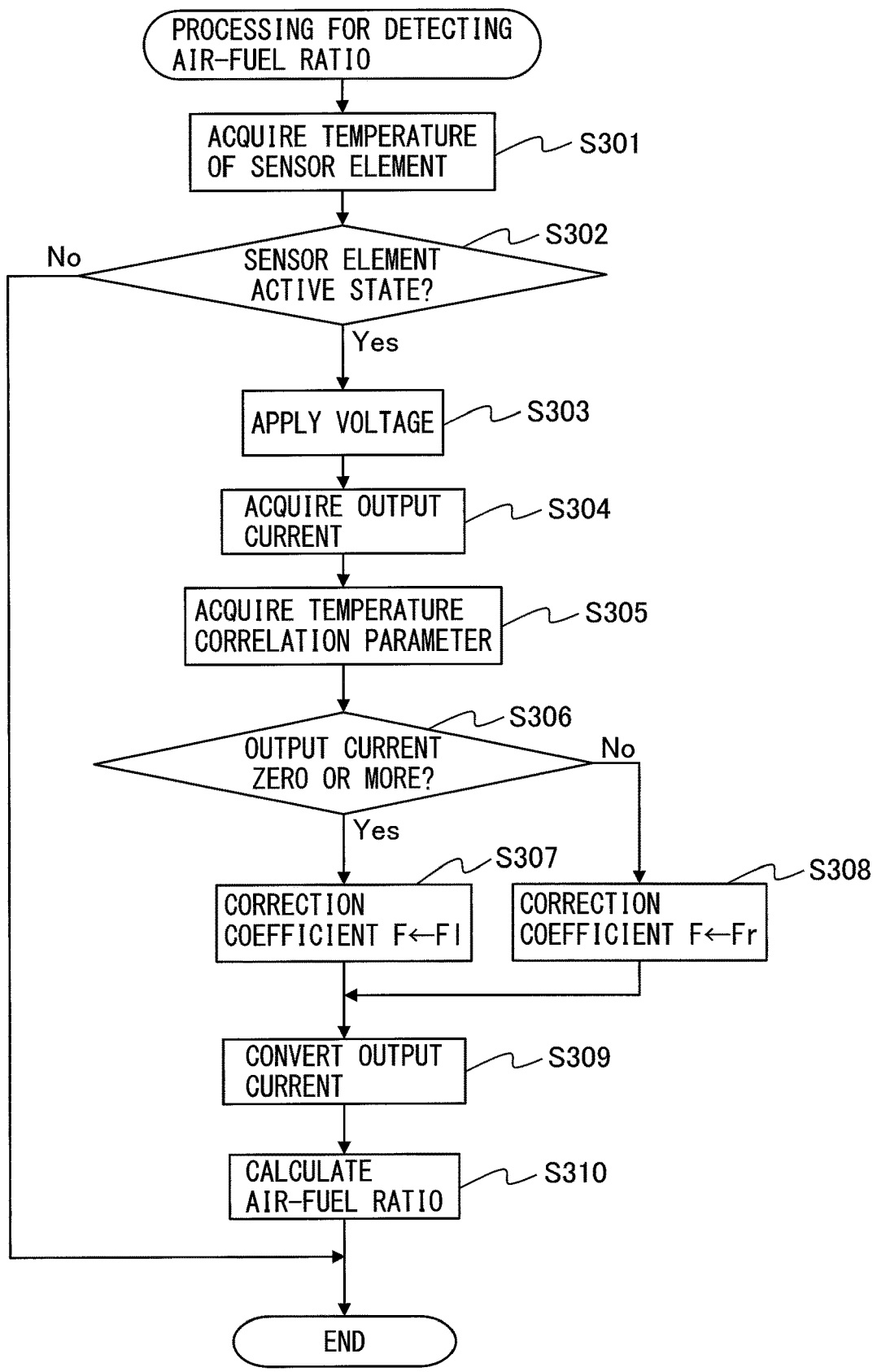
FIG. 12 is a flow chart showing a control routine of processing for detecting an air-fuel ratio in a third embodiment of the present invention.

FIG. 12 is a flow chart showing a control routine of processing for detecting an air-fuel ratio in the third embodiment of the present invention. The present control routine is performed, after the startup of the internal combustion engine, by the ECU 60 at predetermined time intervals. In the present control routine, the sensor element 2 is used to detect the air-fuel ratio.

Step S301 to step S305 are similar to step S101 to step S105 of FIG. 6, so explanations will be omitted. After step S305, at step S306, the air-fuel ratio calculating part 61 judges whether the output current acquired at step S304 is equal to or more than zero. If it is judged that the output current is less than zero, the present control routine proceeds to step S307.

At step S307, the correction coefficient F is set to the rich side correction coefficient Fr corresponding to the temperature correlation parameter acquired at step S305. The rich side correction coefficient Fr is determined in advance for each temperature correlation parameter and is calculated as a ratio of the output current at a reference value of the temperature correlation parameter with respect to the output current at each temperature correlation parameter when the air-fuel ratio is richer than the stoichiometric air-fuel ratio (for example 14) (rich side correction coefficient Fr=output current at reference value/output current at each temperature correlation parameter). The rich side correction coefficient Fr becomes larger the lower the temperature of the sensor element 2.

On the other hand, if at step S306 it is judged that the output current is equal to or more than zero, the present control routine proceeds to step S307. At step S307, the correction coefficient F is set to the lean side correction coefficient Fl corresponding to the temperature correlation parameter acquired at step S305. The lean side correction coefficient Fl is determined in advance for each temperature correlation parameter and is calculated as a ratio of the output current at a reference value of the temperature correlation parameter with respect to the output current at each temperature correlation parameter when the air-fuel ratio is leaner than the stoichiometric air-fuel ratio (for example 16) (lean side correction coefficient Fl=output current at reference value/output current at each temperature correlation parameter). The lean side correction coefficient Fl becomes larger the lower the temperature of the sensor element 2.

After step S307 or step S308, at step S309, the air-fuel ratio calculating part 61 converts the output current acquired at step S304 to a value corresponding to a reference value of the temperature correlation parameter. Specifically, the air-fuel ratio calculating part 61 multiplies the correction coefficient set at step S307 or step S308 with the output current acquired at step S304 (output current after conversion=output current before conversion×correction coefficient).

Next, at step S310, the air-fuel ratio calculating part 61 calculates the air-fuel ratio from the value of the output current converted at step S309. Specifically, the air-fuel ratio calculating part 61 uses a 2D map such as shown in FIG. 3 in which the relationship between the output current I and the air-fuel ratio at a reference value of the temperature correlation parameter is shown to calculate the air-fuel ratio from the value of the output current after conversion. After step S310, the present control routine ends.

Note that, the temperature correlation parameter may be the impedance of the sensor cell 10 or pump cell 20. In this case, the lean side correction coefficient Fl at step S307 and the rich side correction coefficient Fr at step S308 become larger the higher the temperature correlation parameter. Further, if the temperature correlation parameter is the temperature of the sensor element 2, step S305 may be omitted and, at step S307 and step S308, the temperature of the sensor element 2 acquired at step S301 may be used as the temperature correlation parameter.

Fourth Embodiment

The air-fuel ratio detection device according to a fourth embodiment is basically similar in constitution and control to the air-fuel ratio detection device according to the second embodiment except for the points explained below. For this reason, below, the fourth embodiment of the present invention will be explained focusing on the parts different from the second embodiment.

In the fourth embodiment, the air-fuel ratio is corrected based on the temperature correlation parameter instead of the output current of the sensor cell 10. Specifically, the air-fuel ratio calculating part 61 uses the relationship of the output current of the sensor cell 10 and the air-fuel ratio at a reference value of the temperature correlation parameter to calculate the air-fuel ratio from the output current and corrects the calculated air-fuel ratio based on the temperature correlation parameter to thereby calculate the final air-fuel ratio. The reference value is determined in advance.

Referring to FIG. 9, if the relationship of the output current of the sensor cell 10 and the air-fuel ratio at a reference value of the temperature correlation parameter (in the example of FIG. 9, 700° C.) is used, the air-fuel ratio calculated from the output current Ia detected when the temperature of the sensor element 2 is 600° C. becomes AFb. It is necessary to correct this air-fuel ratio to calculate the accurate air-fuel ratio AFa.

As will be understood from FIG. 9, the ratio of the difference between the air-fuel ratio at a predetermined temperature and the stoichiometric air-fuel ratio with respect to the difference of the air-fuel ratio at a reference value and the stoichiometric air-fuel ratio when the output current is a predetermined value (in the example of FIG. 9, (AFa-14.6)/(AFb-14.6)) becomes substantially constant regardless of the output current. For this reason, by adding to the stoichiometric air-fuel ratio the value obtained by multiplying this ratio as a correction coefficient with the difference between the air-fuel ratio before correction and the stoichiometric air-fuel ratio, it is possible to calculate the accurate air-fuel ratio. Note that, this ratio is equal to the ratio of the output current at a reference value with respect to the output current at a predetermined temperature when the air-fuel ratio is a predetermined value (in the example of FIG. 9, Ib/Ia).

Therefore, in the fourth embodiment, the air-fuel ratio calculating part 61 adds to the stoichiometric air-fuel ratio the value obtained by multiplying the correction coefficient corresponding to the temperature correlation parameter with the difference between the air-fuel ratio before correction and the stoichiometric air-fuel ratio to calculate the final air-fuel ratio. By doing this, it is possible to precisely calculate the air-fuel ratio without using a 3D map and possible to reduce the number of steps for preparing a 3D map and reduce the size of the memory of the ECU 60.

<Processing for Detecting Air-Fuel Ratio>

Figure 13:
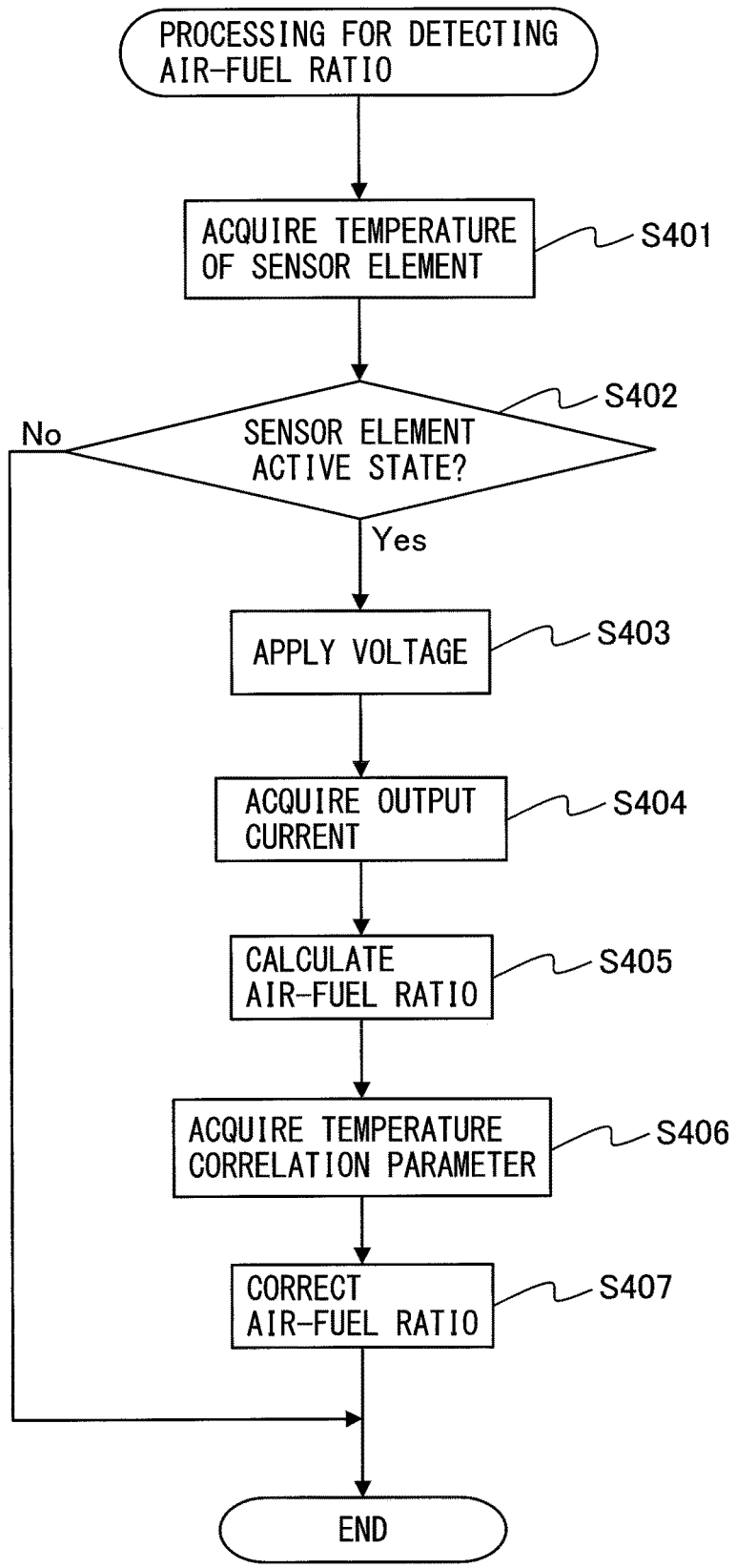
FIG. 13 is a flow chart showing a control routine of processing for detecting an air-fuel ratio in a fourth embodiment of the present invention.

FIG. 13 is a flow chart showing a control routine of processing for detecting an air-fuel ratio in the fourth embodiment of the present invention. The present control routine is performed, after the startup of the internal combustion engine, by the ECU 60 at predetermined time intervals. In the present control routine, the sensor element 2 is used to detect the air-fuel ratio.

Step S401 to step S404 are similar to step S101 to step S104 of FIG. 6, so explanations will be omitted. After step S404, at step S405, the air-fuel ratio calculating part 61 uses a 2D map such as shown in FIG. 3, in which the relationship of the output current of the sensor cell 10 and the air-fuel ratio at a reference value of the temperature correlation parameter is shown, to calculate the air-fuel ratio from the output current acquired at step S404. Next, at step S406, in the same way as step S105 of FIG. 6, the air-fuel ratio calculating part 61 acquires the temperature correlation parameter.

Next, at step S407, the air-fuel ratio calculating part 61 calculates the final air-fuel ratio by correcting the air-fuel ratio calculated at step S405. Specifically, the air-fuel ratio calculating part 61 calculates the final air-fuel ratio by adding to the stoichiometric air-fuel ratio the value obtained by multiplying the correction coefficient corresponding to the temperature correlation parameter acquired at step S406 with the difference of the air-fuel ratio calculated at step S405 and the stoichiometric air-fuel ratio (final air-fuel ratio=correction coefficient×(air-fuel ratio before correction−stoichiometric air-fuel ratio)+stoichiometric air-fuel ratio).

As explained above, the ratio of the difference between the air-fuel ratio at a predetermined temperature and the stoichiometric air-fuel ratio with respect to the difference between the air-fuel ratio at a reference value and the stoichiometric air-fuel ratio when the output current is a predetermined value is equal to the ratio of the output current at a reference value with respect to the output current at a predetermined temperature when the air-fuel ratio is the predetermined value. For this reason, the correction coefficient is preset for each temperature correlation parameter, and in the same way as when the output current of the sensor cell 10 is corrected, it is calculated as the ratio of the output current at a reference value of the temperature correlation parameter with respect to the output current at each temperature correlation parameter when the air-fuel ratio is a predetermined value (correction coefficient=output current at reference value/output current at each temperature correlation parameter). For example, if the temperature correlation parameter is the temperature of the sensor element 2, the relationship of the temperature of the sensor element 2 and the correction coefficient becomes as shown in FIG. 11. The correction coefficient becomes larger the lower the temperature of the sensor element 2. After step S407, the present control routine ends.

Note that, the temperature correlation parameter may be the impedance of the sensor cell 10 or pump cell 20. In this case, the correction coefficient at step S407 becomes larger the higher the temperature correlation parameter. Further, if the temperature correlation parameter is the temperature of the sensor element 2, step S406 may be omitted and, at step S407, the temperature of the sensor element 2 obtained at step S401 may be used as the temperature correlation parameter. Further, at step S407, the air-fuel ratio calculating part 61 may correct the air-fuel ratio using a 3D map where the final air-fuel ratio is shown as a function of a temperature correlation parameter and air-fuel ratio before correction.

Fifth Embodiment

The air-fuel ratio detection device according to a fifth embodiment is basically similar in constitution and control to the air-fuel ratio detection device according to the first embodiment except for the points explained below. For this reason, below, the fifth embodiment of the present invention will be explained focusing on the parts different from the first embodiment.

Figure 14:
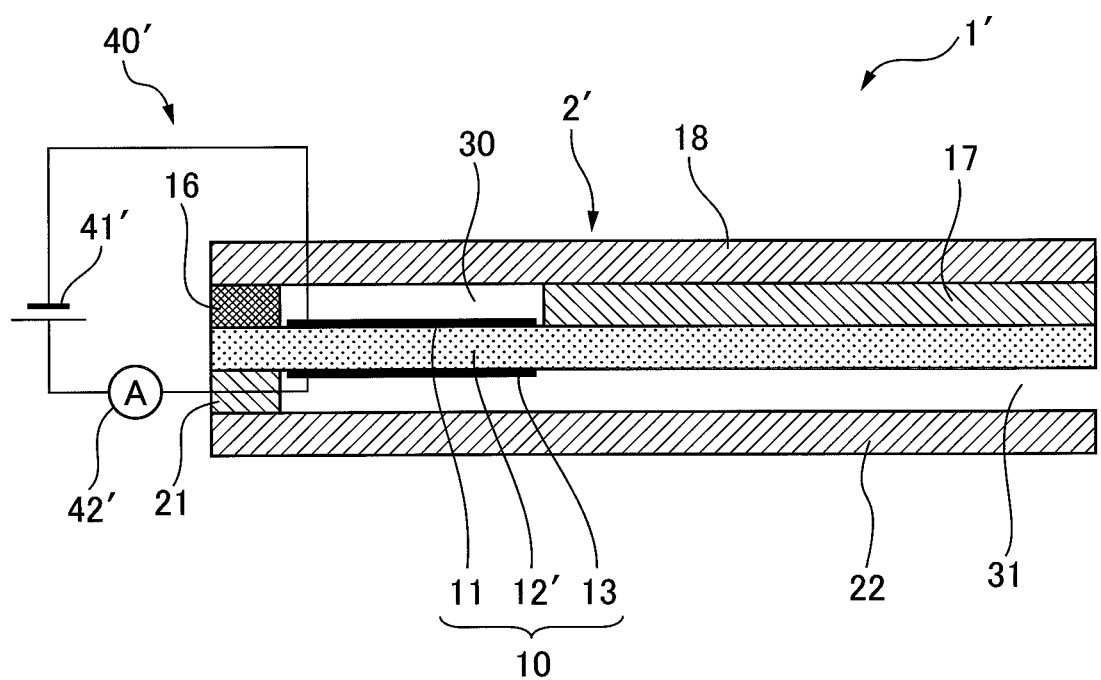
FIG. 14 is a view schematically showing an air-fuel ratio detection device according to a fifth embodiment.

FIG. 14 is a view schematically showing an air-fuel ratio detection device 1' according to the fifth embodiment. The air-fuel ratio detection device 1' is provided with a sensor element 2'. FIG. 14 is a cross-sectional view of the sensor element 2'. The sensor element 2' is comprised of a plurality of layers stacked together. Specifically, the sensor element 2' is provided with a solid electrolyte layer 12', diffusion regulating layer 16, first barrier layer 18, second barrier layer 17, third barrier layer 21, and fourth barrier layer 22.

The layers of the sensor element 2 comprise, from below in FIG. 14, the fourth barrier layer 22, third barrier layer 21, solid electrolyte layer 12', second barrier layer 17 and diffusion regulating layer 16, and first barrier layer 18 stacked in that order. The solid electrolyte layer 12', diffusion regulating layer 16, first barrier layer 18, and second barrier layer 17 define a measured gas chamber 30. The measured gas chamber 30 is configured so that exhaust gas flows through the diffusion regulating layer 16 to the inside of the measured gas chamber 30 when the sensor element 2' is arranged in the exhaust passage. Therefore, the measured gas chamber 30 is communicated with the exhaust passage through the diffusion regulating layer 16.

The solid electrolyte layer 12', third barrier layer 21, and fourth barrier layer 22 define an atmospheric chamber 31. The atmospheric chamber 31 is opened to the atmosphere outside of the exhaust passage through an atmospheric duct. Therefore, atmosphere flows into the atmospheric chamber 31.

The sensor element 2' is further provided with the first electrode 11 and the second electrode 13. The first electrode 11 is arranged on the surface of the solid electrolyte layer 12' on the measured gas chamber 30 side so as to be exposed to the exhaust gas of the measured gas chamber 30. The second electrode 13 is arranged on the surface of the solid electrolyte layer 12' on the atmospheric chamber 31 side so as to be exposed to the atmosphere of the atmospheric chamber 31. The first electrode 11 and the second electrode 13 are arranged so as to face each other across the solid electrolyte layer 12'.

The sensor element 2' is provided with a sensor cell 10. The sensor cell 10 is an electrochemical cell having the first electrode 11, solid electrolyte layer 12', and second electrode 13. The sensor element 2' is a one-cell type sensor element comprised of one electrochemical cell made of a solid electrolyte layer and a pair of electrodes.

The air-fuel ratio detection device 1' is further provided with a voltage application circuit 40' and current detector 42' connected to a sensor cell 10. The voltage application circuit 40' is provided with a power source 41'. The voltage application circuit 40' applies voltage to the sensor cell 10 so that the potential of the second electrode 13 becomes higher than the potential of the first electrode 11. Therefore, the first electrode 11 functions as a negative electrode while the second electrode 13 functions as a positive electrode. The current detector 42' detects the current flowing through the solid electrolyte layer 12' between the first electrode 11 and the second electrode 13, that is, the output current of the sensor cell 10.

In the fifth embodiment as well, the sensor element 2' is used to detect the air-fuel ratio in the same way as the first embodiment.

Other Embodiments

Above, preferred embodiments according to the present invention were explained, but the present invention is not limited to these embodiments. Various corrections and changes may be made within the language of the claims. For example, the sensor elements 2, 2' may be provided with heaters. In this case, by calculating the air-fuel ratio based on the temperature correlation parameter, it is possible to keep the precision of detection of the air-fuel ratio from falling when breakdown of a heater causes the temperature of a sensor element 2 to fluctuate.

Further, the above-mentioned embodiments can be freely combined. For example, if the fourth embodiment is combined with the third embodiment, in the control routine of FIG. 13, step S306 to step S308 of FIG. 12 are added between step S406 and step S407, while at step S407, the correction coefficient set at step S307 or step S308 is used. Further, the fifth embodiment can be combined with the second embodiment, third embodiment, or fourth embodiment. In this case, in the second embodiment, third embodiment, and fourth embodiment, a one-cell type sensor element 2' is used to detect the air-fuel ratio.

REFERENCE SIGNS LIST 1, 1' air-fuel ratio detection device
2, 2' sensor element
10 sensor cell
40 first voltage application circuit
40' voltage application circuit
42 first current detector
42' current detector
60 electronic control unit (ECU)
61 air-fuel ratio calculating part
62 parameter detecting part

The invention claimed is:

1. An air-fuel ratio detection device comprising:
a sensor element including a sensor cell;
a voltage application circuit applying voltage to the sensor cell;
a current detector detecting an output current of the sensor cell;
an air-fuel ratio calculating part configured to calculate an air-fuel ratio of an exhaust gas; and
a parameter detecting part configured to detect or calculate a temperature correlation parameter correlated with a temperature of the sensor element, wherein
the air-fuel ratio calculating part is configured to calculate the air-fuel ratio of the exhaust gas based on the temperature correlation parameter and the output current detected when a predetermined voltage is applied to the sensor cell.

2. The air-fuel ratio detection device according to claim 1, wherein the temperature correlation parameter is a temperature of the sensor element calculated from an impedance of the sensor cell.

3. The air-fuel ratio detection device according to claim 1, wherein the air-fuel ratio calculating part is configured to convert the output current to a value corresponding to a reference value of the temperature correlation parameter based on the temperature correlation parameter, and calculate the air-fuel ratio of the exhaust gas from the converted value using the relationship of the output current and the air-fuel ratio of the exhaust gas at the reference value.

4. The air-fuel ratio detection device according to claim 2, wherein the air-fuel ratio calculating part is configured to convert the output current to a value corresponding to a reference value of the temperature correlation parameter based on the temperature correlation parameter, and calculate the air-fuel ratio of the exhaust gas from the converted value using the relationship of the output current and the air-fuel ratio of the exhaust gas at the reference value.

5. The air-fuel ratio detection device according to claim 3, wherein the air-fuel ratio calculating part is configured to multiply a correction coefficient corresponding to the temperature correlation parameter with the output current to thereby convert the output current to a value corresponding to the reference value.

6. The air-fuel ratio detection device according to claim 4, wherein the air-fuel ratio calculating part is configured to multiply a correction coefficient corresponding to the temperature correlation parameter with the output current to thereby convert the output current to a value corresponding to the reference value.

7. The air-fuel ratio detection device according to claim 1, wherein the air-fuel ratio calculating part is configured to use a relationship between the output current and the air-fuel ratio of the exhaust gas at a reference value of the temperature correlation parameter to calculate the air-fuel ratio of the exhaust gas from the output current, and correct the calculated air-fuel ratio based on the temperature correlation parameter to calculate the final air-fuel ratio of the exhaust gas.

8. The air-fuel ratio detection device according to claim 2, wherein the air-fuel ratio calculating part is configured to use a relationship between the output current and the air-fuel ratio of the exhaust gas at a reference value of the temperature correlation parameter to calculate the air-fuel ratio of the exhaust gas from the output current, and correct the calculated air-fuel ratio based on the temperature correlation parameter to calculate the final air-fuel ratio of the exhaust gas.

9. The air-fuel ratio detection device according to claim 7, wherein the air-fuel ratio calculating part is configured to add a value obtained by multiplying a correction coefficient corresponding to the temperature correlation parameter with a difference between the calculated air-fuel ratio and a stoichiometric air-fuel ratio to the stoichiometric air-fuel ratio to calculate the final air-fuel ratio of the exhaust gas.

10. The air-fuel ratio detection device according to claim 8, wherein the air-fuel ratio calculating part is configured to add a value obtained by multiplying a correction coefficient corresponding to the temperature correlation parameter with a difference between the calculated air-fuel ratio and a stoichiometric air-fuel ratio to the stoichiometric air-fuel ratio to calculate the final air-fuel ratio of the exhaust gas.

11. The air-fuel ratio detection device according to claim 5, wherein the correction coefficient is set to a value different for each sign of the output current.

12. The air-fuel ratio detection device according to claim 6, wherein the correction coefficient is set to a value different for each sign of the output current.

13. The air-fuel ratio detection device according to claim 9, wherein the correction coefficient is set to a value different for each sign of the output current.

14. The air-fuel ratio detection device according to claim 10, wherein the correction coefficient is set to a value different for each sign of the output current.

15. A method of detecting an air-fuel ratio of exhaust gas using a sensor element including a sensor cell, the method comprising:
applying voltage to the sensor cell,
detecting an output current of the sensor cell,
detecting or calculating a temperature correlation parameter correlated with a temperature of the sensor element, and
calculating the air-fuel ratio of the exhaust gas based on the output current and the temperature correlation parameter.

16. An air-fuel ratio detection device comprising:
a sensor element including a sensor cell;
a voltage application circuit applying voltage to the sensor cell;
a current detector detecting an output current of the sensor cell; and a control device, wherein
the control device is configured to calculate an air-fuel ratio of an exhaust gas and detect or calculate a temperature correlation parameter correlated with a temperature of the sensor element, and
the control device is configured to calculate the air-fuel ratio of the exhaust gas based on the temperature correlation parameter and the output current detected when a predetermined voltage is applied to the sensor cell.

* * * * *